(12) United States Patent
Ashcraft et al.

(10) Patent No.: US 9,489,060 B2
(45) Date of Patent: Nov. 8, 2016

(54) STYLUS EXTENDER

(75) Inventors: Britt C Ashcraft, Tomball, TX (US); Eric Chen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/347,310

(22) PCT Filed: Jan. 27, 2012

(86) PCT No.: PCT/US2012/022814
§ 371 (c)(1),
(2), (4) Date: Mar. 26, 2014

(87) PCT Pub. No.: WO2013/112167
PCT Pub. Date: Aug. 1, 2013

(65) Prior Publication Data
US 2014/0327661 A1 Nov. 6, 2014

(51) Int. Cl.
*G06F 3/0354* (2013.01)
*G06F 1/16* (2006.01)

(52) U.S. Cl.
CPC ......... *G06F 3/03545* (2013.01); *G06F 1/1626* (2013.01); *G06F 2200/1632* (2013.01)

(58) Field of Classification Search
CPC ............. G06F 1/1613; G06F 3/03545; G06F 1/1626; G06F 2200/1632; G11B 27/10
See application file for complete search history.

(56) References Cited

U.S. PATENT DOCUMENTS

| | | | | |
|---|---|---|---|---|
| 5,267,123 A * | 11/1993 | Boothroyd | ............ | G06F 1/1616 16/361 |
| 5,375,076 A * | 12/1994 | Goodrich | ............. | G06F 1/1626 361/679.17 |
| 5,818,360 A * | 10/1998 | Chu | ....................... | G06F 1/1667 248/118.3 |
| 6,398,027 B1 * | 6/2002 | Ryu | ..................... | A45C 11/008 206/362 |
| 6,410,865 B1 | 6/2002 | Liu et al. | | |
| 6,604,294 B1 * | 8/2003 | Farley | ...................... | B25H 7/00 33/27.03 |
| 6,679,468 B1 * | 1/2004 | Hsu | .......................... | A45C 9/00 248/454 |
| 7,385,596 B2 | 6/2008 | Lin | | |
| 8,027,055 B2 | 9/2011 | Silverbrook et al. | | |
| 2002/0101411 A1 * | 8/2002 | Chang | ................... | G06F 1/1626 345/179 |
| 2004/0119703 A1 | 6/2004 | Yang et al. | | |
| 2007/0013675 A1 | 1/2007 | Nitobe et al. | | |
| 2010/0159997 A1 | 6/2010 | Wang | | |
| 2012/0013781 A1 * | 1/2012 | Yamagiwa | ............ | G06F 1/1626 348/333.01 |

FOREIGN PATENT DOCUMENTS

| | | |
|---|---|---|
| JP | 07-104907 | 4/1995 |
| JP | 07-121288 | 5/1995 |

OTHER PUBLICATIONS

Korean Intellectual Property Office, International Search Report and Written Opinion for PCT/US2012/022814 dated Oct. 29, 2012 (9 pages).

\* cited by examiner

*Primary Examiner* — Md Saiful A Siddiqui
(74) *Attorney, Agent, or Firm* — Trop, Pruner & Hu, P.C.

(57) ABSTRACT

Embodiments disclosed herein relate to a stylus extender. In one embodiment, an electronic device housing includes a stylus extender. The stylus extender may be attached to a door hinging from the electronic device housing for containing the stylus. The stylus extender may push the stylus forward when the door is opened.

16 Claims, 2 Drawing Sheets

STYLUS EXTENDER

CROSS-REFERENCE TO RELATED APPLICATION

This application is a national stage application under 35 U.S.C. §371 of PCT/US2012/022814, filed Jan. 27, 2012.

BACKGROUND

Touch input may allow a user to provide input to an electronic device without the use of a keyboard, mouse, or other peripheral device. In some cases, an electronic device may allow for a user to provide touch input with a stylus. A stylus may allow for more precise user input and may cause fewer contaminants on a display screen than user input provided by a finger.

BRIEF DESCRIPTION OF THE DRAWINGS

The drawings describe example embodiments. The following detailed description references the drawings, wherein.

DETAILED DESCRIPTION

A stylus may be included with an electronic device for allowing a user to provide touch input to the electronic device. The electronic device housing may include a manner for storing the stylus within the electronic device housing and a stylus extender for popping the stylus out of the electronic device in a manner that provides for quick access to the stylus. For example, the stylus may be contained within a groove in the electronic device housing covered by a door, and the door may include a stylus extender that pushes the stylus up and out of the groove as the door is opened. The stylus extender may be a piece of metal, plastic, or other material that is moved with the door as the door is opened, and the stylus extender may move towards the stylus as the door is opened. Including the stylus extender mechanism within the door may allow for the stylus to be concealed by the door when not in use while being easily available when the door is opened to allow a user to remove the stylus.

Figure 1:
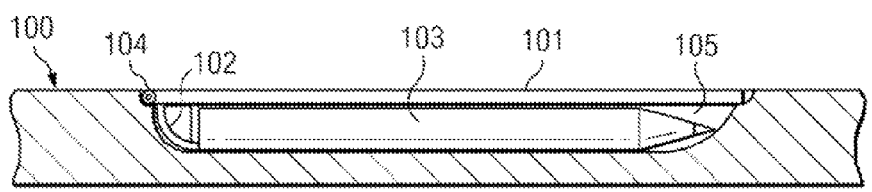
FIG. 1 is a diagram illustrating one example of a cross section view of an electronic device housing including a stylus extender attached to a closed door.

FIG. 1 is a diagram illustrating one example of a cross section view of an electronic device housing including a stylus extender attached to a closed door. The electronic device housing 100 may contain any suitable electronic device, such as a slate, mobile, or laptop computing device. The electronic device may be a portable electronic device that receives user input via a stylus 103. The electronic device may include a display designed to interpret touch input from the stylus 103. For example, the display may include an optical or resistive sensor for interpreting touch input from the stylus 103 to the display.

The stylus 103 may be a stylus for providing user input to the electronic device. The stylus 103 may be shaped with a pointed end for providing input to the electronic device. For example, writing or other actions may be more easily interpreted from a more defined point of a stylus than from a user's finger. In some cases, the stylus 103 may be shaped similarly to a pencil. The stylus 103 may include a material used to conduct electricity, such as on the tip of the stylus 103.

The electronic device housing 100 may include a groove 105 for containing the stylus 103, and the stylus 103 may be stored in the electronic device housing 100 when not in use. For example, the groove 105 may be an indention in the electronic device housing 100 for holding the stylus. The groove 105 may be made of the same material or a different material from the rest of the electronic device housing 100.

A door 101 may cover the groove 105 in the electronic device housing 100. The door 101 may cover the groove 105 such that the stylus 103 is not visible. The door 101 may be made from any suitable material. The door 101 may be made from the same material as the electronic device housing 100 such that it may blend in with the housing when closed. The door 101 may be attached to the electronic device 100 via a hinge 104. The hinge 104 may be any suitable mechanism to attach the door 101 to the electronic device 100 to allow the door 101 to pivot open and closed.

The door 101 may include an attached stylus extender 102. The stylus extender 102 may be positioned on the door 101 on the end of the door with the hinge 104. The stylus extender 102 may extend towards the groove 105 such that a first end of the stylus extender 102 is attached to the door 101 and a second end of the stylus extender 102 is parallel to the bottom of the groove 105. In some implementations, the stylus extender 102 may be curved. The stylus extender 102 may be any suitable material, such as plastic or metal. In some cases, the stylus extender 102 may be made from the same material as the electronic device housing 100. The stylus extender 102 may be any suitable shape. In some cases in may be cylindrical. The stylus extender 102 may have a larger surface area on the end designed to touch the stylus 103. For example, the stylus extender 102 may be cylindrical with a larger flat end designed to push the stylus 103 from the groove 105. The stylus extender may be part of the door or may be removably attached to the door.

Figure 2:
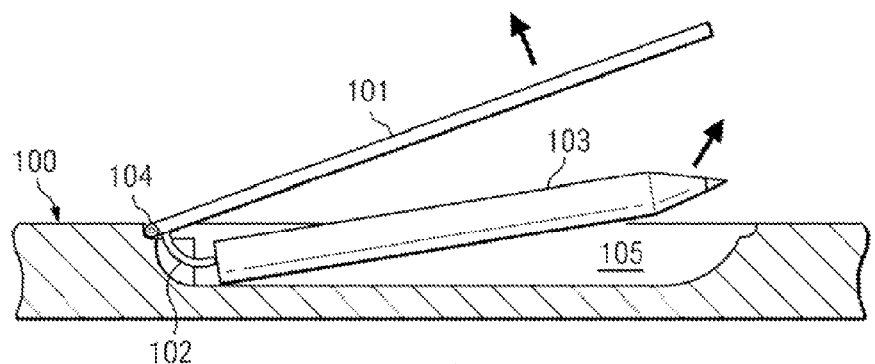
FIG. 2 is a diagram illustrating one example of a cross section view of an electronic device housing including a stylus extender attached to an open door.

FIG. 2 is a diagram illustrating one example of a cross section view of an electronic device housing including a stylus extender attached to an open door. When the door 101 pivots on the hinge 104 to open, the stylus extender 102 attached to the door 101 may push forward in the groove 105. If the stylus 103 is in the groove 105, the stylus extender may push the stylus 103 forward in the groove 105. The groove 105 may be shaped such that the stylus is pushed out of the groove 105 when the stylus extender 102 pushes the end of the stylus 103. For example, the end of the groove 105 opposite the hinge 104 may be curved such that the stylus 103 is pushed up as it is pushed forward. As another example, the bottom of the groove 105 may be slanted upward to push the stylus 103 out of the groove 105. The stylus 103 may be pushed out of the groove 105 such that a user may more easily grasp it. FIG. 2 shows the stylus 103 moving out of the groove 105 as the door 101 is opened along the hinge 104.

In one implementation, the stylus 103 includes an inlet in the end of the stylus such that the stylus extender 102 is partially inserted into the inlet when the stylus 103 is placed in the groove 105. For example, a user may place the stylus 103 in the groove such that the stylus extender 102 is partially in the inlet. The inlet may allow the stylus extender 102 to be more securely attached to the stylus 103 and may make the forward motion of the stylus 103 more controlled. In some cases, the stylus extender 102 includes a cap or other structure on the end opposite the end attached to the door that allows the stylus 103 to fit inside the stylus extender 102.

In one implementation, the stylus 103 is further attached to the groove 105. For example, a string or other mechanism may attach the stylus 103 to the electronic device housing 100 or the groove 105. The string or other mechanism may stay attached to the stylus 103 while in use or may be detached from the stylus 103 when the stylus 103 is in use and removed from the groove 105. The groove 105 may include another structure to secure the stylus 103. For example, a plastic or metal structure may allow the stylus 103 to fit more securely in the groove 105.

In one implementation, the stylus extender 102 is further accompanied by a spring or other mechanism for pushing the stylus 103 out of the groove 105. For example, the groove 105 may include a spring on the side of the hinge 104 such that the spring assists the stylus extender 102 in pushing the stylus 103 out of the groove 105. Other mechanisms may also be used in conjunction with the stylus extender 102 to push the stylus out of the groove 105.

Figure 3:
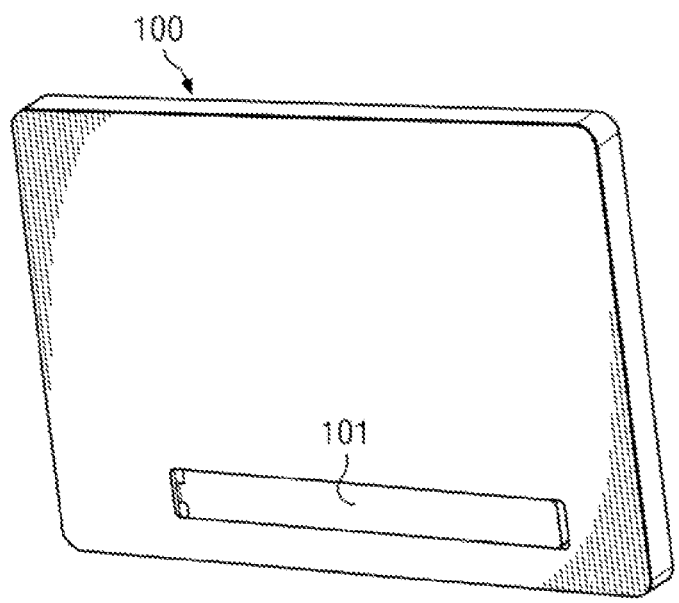
FIG. 3 is a diagram illustrating one example of a rear view of an electronic device housing including a stylus extender attached to a closed door.

FIG. 3 is a diagram illustrating one example of a rear view of an electronic device housing including a stylus extender attached to a closed door. The door 101 covers the groove 105. The door 101 may be close against the electronic device housing 100 when closed such that the door 101 blends with the electronic device housing 100 for an aesthetically pleasing appearance. The groove 105 may be in any suitable position on the electronic device housing 100, such as on the front, back, or side of the electronic device housing 100. The door 101 may be closed when the stylus 103 is placed back in the groove 105 for storage. In some implementations, the door 101 may be closed when the stylus 103 is out of the groove 105.

Figure 4:
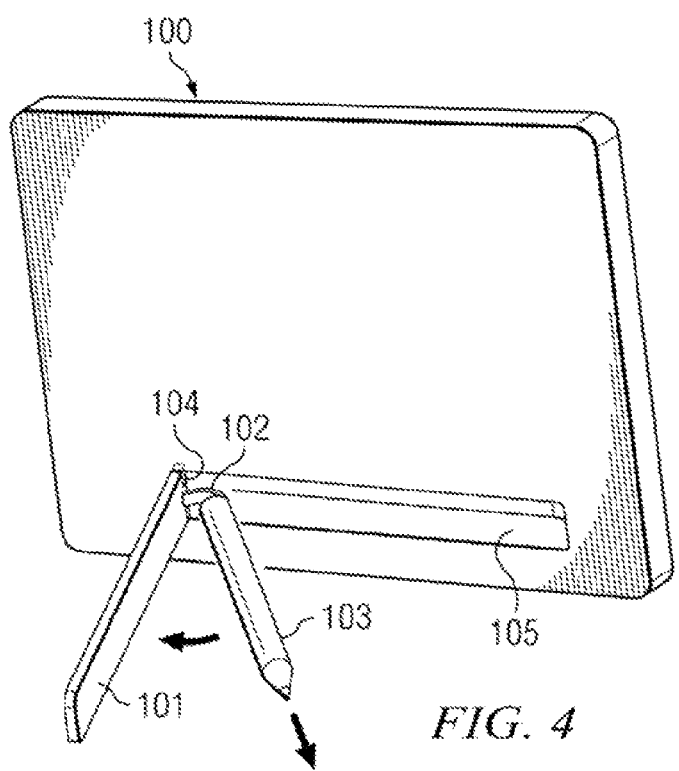
FIG. 4 is a diagram illustrating one example of a rear view of an electronic device housing including a stylus extender attached to an open door.

FIG. 4 is a diagram illustrating one example of a rear view of an electronic device housing including a stylus extender attached to an open door. FIG. 4 shows the stylus 103 being pushed out of the groove 105 by the stylus extender 102, making the stylus 103 more easy to grasp by a user.

The invention claimed is:

1. An apparatus, comprising:
   a stylus;
   a housing comprising an external groove to receive the stylus, the groove comprising an inclined surface, the inclined surface comprising a curved surface;
   a hinge coupled to the housing;
   a door coupled to the hinge and pivotable between a closed position to cover the groove and hide the stylus in the groove, and an open position to uncover the groove, the door comprising a surface that faces the groove; and
   a stylus extender attached to the surface of the door that faces the groove, wherein the stylus extender extends inside the groove when the door is in the closed position, the stylus extender comprising a curved element that has a first end attached to the surface of the door and a second end engaged to the stylus when the stylus is in the groove, and wherein the stylus extender is positioned to push the stylus against the inclined surface of the groove to eject the stylus from the groove responsive to the door being moved from the closed position to the open position.

2. The apparatus of claim 1, wherein the inclined surface of the groove is at a first end of the groove opposite a second end of the groove at which the hinge is coupled to the housing.

3. The apparatus of claim 1, wherein the stylus comprises an inlet on an end of the stylus to receive the second end of the curved element of the stylus extender when the stylus is disposed in the groove and the door is in the closed position.

4. The apparatus of claim 1, further comprising a spring coupled to an end of the groove to push on the stylus.

5. The apparatus of claim 1, wherein the housing has a rear surface that is opposite a surface of the housing comprising a display, and wherein the groove is located in the rear surface.

6. The apparatus of claim 1, wherein the stylus extender rotates with the door as the door moves from the closed position to the open position, the second end of the curved element pushing the stylus as the stylus extender rotates with the door.

7. The apparatus of claim 1, wherein the stylus is different from a keyboard.

8. The apparatus of claim 1, wherein the stylus has a first end that is engageable with a touch display to provide input to the touch display, and a second end that is engaged to the stylus extender when the stylus is in the groove, the stylus extender to push the first end of the stylus against the inclined surface responsive to the door being moved from the closed position to the open position.

9. A method comprising:
   providing a groove comprising an inclined surface in a housing, the groove to receive a stylus, and the inclined surface comprising a curved surface;
   pivotally attaching a door to the housing with a hinge, the door pivotable between a closed position to cover the groove and hide the stylus in the groove, and an open position to uncover the groove, the door comprising a surface that faces the groove; and
   attaching a stylus extender to the surface of the door that faces the groove, wherein the stylus extender extends inside the groove when the door is in the closed position, the stylus extender comprising a curved element that has a first end attached to the surface of the door and a second end engaged to the stylus when the stylus is in the groove, and wherein the stylus extender rotates with pivoting of the door and pushes the stylus against the inclined surface of the groove to eject the stylus from the groove responsive to the door being moved from the closed position to the open position.

10. The method of claim 9, wherein the stylus is guided out of the groove along the curved surface when the stylus is pushed by the stylus extender against the curved surface.

11. The method of claim 9, wherein the stylus by the stylus extender is inserted into an inlet of the stylus when the stylus is in the groove.

12. The method of claim 9, further comprising arranging the groove in a rear surface of the housing, the rear surface of the housing opposite a surface of the housing comprising a display.

13. An apparatus, comprising:
   a housing;
   an indention in the housing for containing a stylus, the indention having an inclined surface at an end of the groove, and the inclined surface comprising a curved surface;
   a door;
   a hinge to connect the door to the housing to cover the indention; and a stylus extender attached to a side of the door at a first end of a curved element of the stylus extender, wherein a second end of the curved element of the stylus extender pushes the stylus against the inclined surface of the indention to eject the stylus from the indention responsive to the door being moved from a closed position to an open position, the second end of the curved element engaged to the stylus when the stylus is in the indention.

14. The apparatus of claim 13, further comprising a spring within the indention proximate the hinge.

15. The apparatus of claim 13, further comprising a display supported by the housing.

16. The apparatus of claim 13, wherein the housing has a rear surface that is opposite a surface of the housing to support a display, and wherein the indention is located in the rear surface.

* * * * *

UNITED STATES PATENT AND TRADEMARK OFFICE
CERTIFICATE OF CORRECTION

PATENT NO. : 9,489,060 B2  
APPLICATION NO. : 14/347310  
DATED : November 8, 2016  
INVENTOR(S) : Britt C. Ashcraft et al.

Page 1 of 1

It is certified that error appears in the above-identified patent and that said Letters Patent is hereby corrected as shown below:

In Column 4, Lines 52-53 approx., in Claim 11, delete "stylus by the stylus extender" and insert -- stylus extender --, therefor.

Signed and Sealed this  
Seventh Day of February, 2017

Michelle K. Lee  
*Director of the United States Patent and Trademark Office*